(12) United States Patent
Hong et al.

(10) Patent No.: US 12,476,849 B2
(45) Date of Patent: Nov. 18, 2025

(54) RECEIVER CIRCUIT AND OPERATION METHOD FOR THE SAME

(71) Applicant: SK hynix Inc., Gyeonggi-do (KR)

(72) Inventors: Jae Hyeong Hong, Gyeonggi-do (KR); Gwan Woo Kim, Gyeonggi-do (KR); Beom Kyu Seo, Gyeonggi-do (KR); Keun Seon Ahn, Gyeonggi-do (KR); Soon Sung An, Gyeonggi-do (KR); Sung Hwa Ok, Gyeonggi-do (KR); Jun Seo Jang, Gyeonggi-do (KR); Eun Ji Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/637,479

(22) Filed: Apr. 17, 2024

(65) Prior Publication Data

US 2025/0193057 A1    Jun. 12, 2025

(30) Foreign Application Priority Data

Dec. 7, 2023   (KR) .................. 10-2023-0176342

(51) Int. Cl.
*H04L 25/03* (2006.01)
(52) U.S. Cl.
CPC .............. *H04L 25/03057* (2013.01)
(58) Field of Classification Search
CPC ................................ H04L 25/03057
See application file for complete search history.

(56) References Cited

U.S. PATENT DOCUMENTS

| | | | |
|---|---|---|---|
| 6,754,294 B1* | 6/2004 | Adireddy | H04L 25/03057 375/348 |
| 2020/0265882 A1 | 8/2020 | Karim | |
| 2022/0123973 A1* | 4/2022 | Kim | H04L 25/03866 |
| 2022/0215865 A1* | 7/2022 | Woo | G11C 7/02 |
| 2022/0360476 A1 | 11/2022 | Palusa et al. | |
| 2023/0308320 A1* | 9/2023 | Ikeda | H04L 25/03057 |

FOREIGN PATENT DOCUMENTS

| | | | |
|---|---|---|---|
| KR | 10-2019-0069774 A | 6/2019 | |
| KR | 10-2022-0099251 A | 7/2022 | |
| KR | 10-2433040 B1 | 8/2022 | |

* cited by examiner

*Primary Examiner* — Janice N Tieu
(74) *Attorney, Agent, or Firm* — IP & T GROUP LLP

(57) ABSTRACT

A receiver circuit includes an input unit configured to receive a reception pattern signal in a training mode, and a reception normal signal in a normal mode, an enable control unit configured to determine whether to activate an enable signal according to the reception pattern signal in the training mode, a first decision feedback equalizer configured to operate in an activation period of the enable signal, and to remove a first post-cursor component for the reception normal signal by calibrating a currently received value based on a previously received value of the reception normal signal, and a second decision feedback equalizer configured to, when the enable signal is in an activated state, remove second to $N^{th}$ post-cursor components for the reception normal signal by adjusting driving abilities of input transistors, to which the currently received value is applied, according to patterns of the reception normal signal.

20 Claims, 11 Drawing Sheets

103 or 203

RECEIVER CIRCUIT AND OPERATION METHOD FOR THE SAME

CROSS-REFERENCE TO RELATED APPLICATION

This application claims priority under 35 U.S.C. § 119 to Korean Patent Application No. 10-2023-0176342 filed on Dec. 7, 2023, which is incorporated herein by reference in its entirety.

BACKGROUND

1. Field

Various embodiments of the present disclosure generally relate to a semiconductor circuit, and particularly, to a receiver circuit having an equalization function and an operation method for the same.

2. Discussion of the Related Art

Electronic devices may include many electronic components, and among the electronic devices, a computer system may include many semiconductor apparatuses made of semiconductors. Among various semiconductor apparatuses implemented using semiconductors, are devices using a memory system as a storage medium, for example, portable digital electronic devices such as digital cameras, smart phones, and tablet personal computers (PCs) may include volatile memory devices and nonvolatile memory devices in order to store data. The volatile memory device is a memory device in which stored data is lost when power is cut off. Examples of the volatile memory device may include a static random access memory (RAM) (SRAM), a dynamic RAM (DRAM), a synchronous DRAM (SDRAM), and the like. The nonvolatile memory device is a memory device in which stored data is retained even though even though power is cut off. Examples of the nonvolatile memory device may include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and the like. The flash memory may be broadly classified into a NOR flash memory and a NAND flash memory.

Such memory devices may communicate with each other by transmitting and receiving clock signals and data. The memory devices may transmit signals with information corresponding to data through a signal bus such as a data bus. The memory devices may each include a signal transmission circuit in order to transmit signals through a signal bus. The signal transmission circuit may transmit signals by transmitting an analog voltage through the signal bus. In general, the signal transmission circuit may transmit an analog voltage corresponding to a high logic level and an analog voltage corresponding to a low logic level.

In a signal input and output (input/output) interface included in the memory device, data signals may be transmitted to a receiver through a channel. As a data rate increases, an interference signal due to a channel effect may increase, resulting in a decrease in signal quality. In order to improve degraded signal integrity (SI) characteristics, equalization functions are used. A decision feedback equalizer (DFE), which is one of several types of equalizers that provide an equalization function, may improve the SI characteristics by cancelling out an interference signal, that is, a post-cursor causing inter-symbol interference (ISI).

Among the equalization functions of the DFE, DFEs using a direct feedback method may include a Current-summer DFE and a Gm-control DFE. The Current-summer DFE may refer to a direct feedback DFE that performs an equalization function by directly calibrating a currently received signal by using the value of a previously (post) received signal. The Gm-control DFE may refer to a direct feedback DFE that performs an equalization function by adjusting the driving ability of a transistor to which a currently received signal is input, according to the pattern of a value of a previously received signal, that is, by an indirect method. The Current-summer DFE consumes more current than the Gm-control DFE but may improve the SI characteristics of a received signal more effectively.

SUMMARY

Various embodiments of the present disclosure are directed to providing a receiver circuit that confirms inter-symbol interference (ISI) occurring in a signal input through a training operation performed before a normal operation after power-up and adjusts an equalization function applied in the normal operation according to the confirmation result, and an operation method for the same.

Technical problems to be achieved in the present disclosure are not limited to the aforementioned technical issues and the other unmentioned technical issues will be clearly understood by those skilled in the art from the following description.

An embodiment of the present disclosure includes a receiver circuit that may include: a first input unit configured to receive a first input pattern signal as a first reception pattern signal according to a training reference level, and to receive a first input normal signal as a first reception normal signal according to a normal reference level, wherein the first input pattern signal is applied through a first pad in a training mode, and the first input normal signal is applied through the first pad in a normal mode after the training mode; a first enable control unit configured to determine whether to activate a first enable signal according to a result of confirming a value of the first reception pattern signal in the training mode; a first decision feedback equalizer configured to operate in an activation period of the first enable signal, and to remove a first post-cursor component for the first reception normal signal by calibrating a currently received value based on a first previously received value of the first reception normal signal; and a second decision feedback equalizer configured to, when the first enable signal is in an activated state, remove second to Nth post-cursor components for the first reception normal signal by adjusting driving abilities of first input transistors, to which the currently received value is applied, according to patterns of second to Nth previous received values of the first reception normal signal, where N is a natural number of 2 or more.

An embodiment of the present disclosure includes an operation method of a receiver circuit that may include: a first reception operation of receiving a first input pattern signal as a first reception pattern signal according to a training reference level, and receiving a first input normal signal as a first reception normal signal according to a normal reference level, wherein the first input pattern signal is applied through a first pad in a training mode, and the first input normal signal is applied through the first pad in a normal mode after the training mode; a first enable control operation of determining whether to activate a first enable signal according to a result of confirming a value of the first reception pattern signal; and an operation of, when the first enable signal is in an activated state in the normal mode, removing a first post-cursor component for the first reception normal signal by calibrating a currently received value based on a first previously received value of the first reception normal signal, and removing second to Nth post-cursor components for the first reception normal signal by adjusting driving abilities of first input transistors, to which the currently received value is applied, according to patterns of second to Nth previous received values, where N is a natural number of 2 or more.

The present technology can confirm inter-symbol interference (ISI) occurring in a signal input through a training operation performed before a normal operation after power-up and adjust an equalization function applied in the normal operation according to the confirmation result.

That is, the present technology can put at least two types of decision feedback equalizers (DFEs) into a receiver circuit, and then perform the normal operation in a state of selecting a DFE that is enabled according to the degree of occurrence of ISI in an input signal confirmed through a training operation.

This makes it possible to minimize the amount of current consumed by a receiver circuit in order to use an equalization function in a period in which the normal operation is performed.

DETAILED DESCRIPTION

Figure 1:
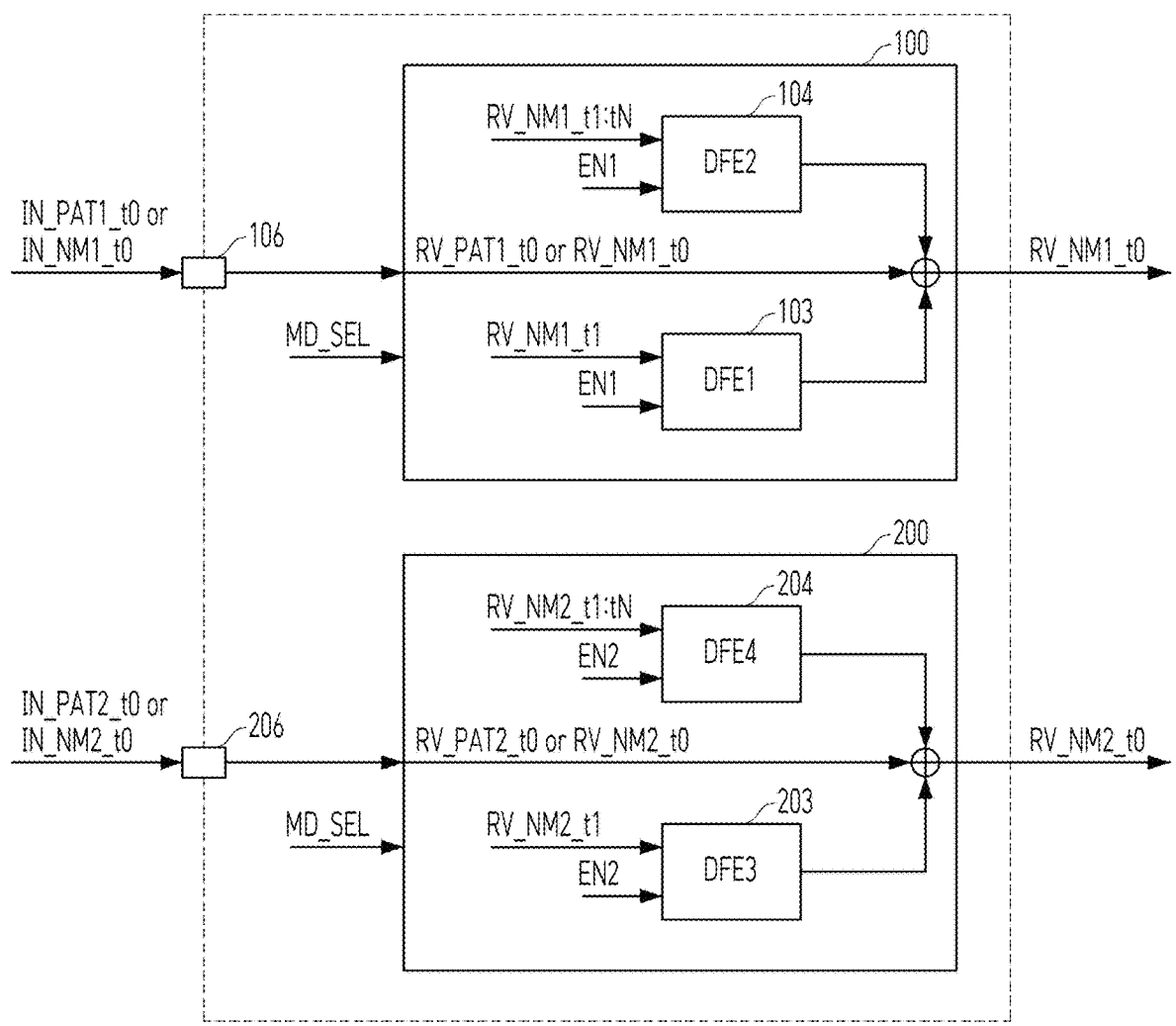
FIG. 1 is a diagram illustrating a receiver circuit in accordance with an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware, for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

FIG. 1 is a diagram illustrating an example of a receiver circuit 1 in accordance with an embodiment of the present disclosure.

Referring to FIG. 1, the receiver circuit 1 may include a first receiver operation unit 100 and a second receiver operation unit 200. The first receiver operation unit 100 may include a first decision feedback equalizer (DFE1) 103 (hereinafter, referred to as a first equalizer), and a second decision feedback equalizer (DFE2) 104 (hereinafter, referred to as a second equalizer). The second receiver operation unit 200 may include a third decision feedback equalizer (DFE3) 203 (hereinafter, referred to as a third equalizer), and a fourth decision feedback equalizer (DFE4) 204 (hereinafter, referred to as a fourth equalizer).

The first receiver operation unit 100 may receive a first input pattern signal IN_PAT1_t0 applied through a first pad 106 in a training mode, as a first reception pattern signal RV_PAT1_t0 according to a training reference level. Then, the first receiver operation unit 100 may determine whether to activate a first enable signal EN1 by confirming whether the value of the received first reception pattern signal RV_PAT1_t0 has a predetermined pattern value.

The second receiver operation unit 200 may receive a second input pattern signal IN_PAT2_t0 applied through a second pad 206 in the training mode, as a second reception pattern signal RV_PAT2_t0 according to the training reference level. Then, the second receiver operation unit 200 may determine whether to activate a second enable signal EN2 by confirming whether the value of the received second reception pattern signal RV_PAT2_t0 has the predetermined pattern value.

In such a case, the training mode is an operation mode that may be entered and exited in response to a mode selection signal MD_SEL, and the first receiver operation unit 100 and the second receiver operation unit 200 may enter the operation mode and exit from operation mode in parallel. That is, after entering the training mode, the first reception pattern signal RV_PAT1_t0 and the second reception pattern signal RV_PAT2_t0 may be input in parallel to the first receiver operation unit 100 and the second receiver operation unit 200, respectively. An operation of the first receiver operation unit 100 to determine whether to activate the first enable signal EN1 according to the value of the first reception pattern signal RV_PAT1_t0 and an operation of the second receiver operation unit 200 to determine whether to activate the second enable signal EN2 according to the value of the second reception pattern signal RV_PAT2_t0 may be performed in parallel.

However, the first receiver operation unit 100 and the second receiver operation unit 200 may operate independently. For example, after entering the training mode, when the first receiver operation unit 100 determines the first enable signal EN1 to be in an activated state, the second receiver operation unit 200 may determine the second enable signal EN2 to be in a deactivated state.

The first receiver operation unit 100 may receive a first input normal signal IN_NM1_t0 applied through the first pad 106 in a normal mode entered after escaping from the training mode, as a first reception normal signal RV_NM1_t0 according to a normal reference level different from the training reference level. In such a case, the first receiver operation unit 100 may enable at least one of the DFE1 103 and the DFE2 104 included therein in order to improve the signal integrity (SI) characteristics of the first reception normal signal RV_NM1_t0.

In particular, the first receiver operation unit 100 may select whether to enable the DFE1 103 according to the activation or deactivation of the first enable signal EN1 in the normal mode, and change an operation method of the DFE2 104 according to the activation or deactivation of the first enable signal EN1 in the normal mode.

For example, the first receiver operation unit 100 may enable the DFE1 103 in the normal mode in response to the activation of the first enable signal EN1 in the training mode, thereby removing a first post-cursor component for the first reception normal signal RV_NM1_t0 based on a first previous (post) received value RV_NM1_t1 of the first reception normal signal RV_NM1_t0. The first receiver operation unit 100 may also enable the DFE2 104 by a first operation method in the normal mode in response to the activation of the first enable signal EN1 in the training mode, thereby removing second to $N^{th}$ post-cursor components for the first reception normal signal RV_NM1_t0 based on second to $N^{th}$ previous received values RV_NM1_t2:tN of the first reception normal signal RV_NM1_t0. Here, N may be a natural number of 2 or more.

For another example, the first receiver operation unit 100 may disable the DFE1 103 in the normal mode in response to the deactivation of the first enable signal EN1 in the training mode. The first receiver operation unit 100 may also enable the DFE2 104 by a second operation method in the normal mode in response to the deactivation of the first enable signal EN1 in the training mode, thereby removing first to $N^{th}$ post-cursor components for the first reception normal signal RV_NM1_t0 based on first to $N^{th}$ previous received values RV_NM1_t1:tN of the first reception normal signal RV_NM1_t0.

The second receiver operation unit 200 may receive a second input normal signal IN_NM2_t0 applied through the second pad 206 in the normal mode entered after escaping from the training mode, as a second reception normal signal RV_NM2_t0 according to a normal reference level different from the training reference level. In such a case, the second receiver operation unit 200 may enable at least one of the DFE3 203 and the DFE4 204 included therein in order to improve the SI characteristics of the second reception normal signal RV_NM2_$t$0.

In particular, the second receiver operation unit 200 may select whether to enable the DFE3 203 according to the activation or deactivation of the second enable signal EN2 in the normal mode, and change an operation method of the DFE4 204 according to the activation or deactivation of the second enable signal EN2 in the normal mode.

For example, the second receiver operation unit 200 may enable the DFE3 203 in the normal mode in response to the activation of the second enable signal EN2 in the training mode, thereby removing a first post-cursor component for the second reception normal signal RV_NM2_$t$0 based on a first previous received value RV_NM1_$t$1 of the second reception normal signal RV_NM2_$t$0. The second receiver operation unit 200 may also enable the DFE4 204 by the first operation method in the normal mode in response to the activation of the second enable signal EN2 in the training mode, thereby removing second to $N^{th}$ post-cursor components for the second reception normal signal RV_NM2_$t$0 based on second to $N^{th}$ previous received values RV_NM1_$t$2:$t$N of the second reception normal signal RV_NM2_$t$0.

For another example, the second receiver operation unit 200 may disable the DFE3 203 in the normal mode in response to the deactivation of the second enable signal EN2 in the training mode. The second receiver operation unit 200 may also enable the DFE4 204 by the second operation method in the normal mode in response to the deactivation of the second enable signal EN2 in the training mode, thereby removing first to $N^{th}$ post-cursor components for the second reception normal signal RV_NM2_$t$0 based on first to $N^{th}$ previous received values RV_NM1_$t$2:$t$N of the second reception normal signal RV_NM2_$t$0.

Each of the first reception normal signal RV_NM1_$t$0 and the second reception normal signal RV_NM2_$t$0 may include one main-cursor component and N post-cursor components. In such a case, the main-cursor component may be a significant component of each of the first reception normal signal RV_NM1_$t$0 and the second reception normal signal RV_NM2_$t$0, and may mean a target value of a signal actually applied through a pad. The post-cursor component may be a meaningless component of each of the first reception normal signal RV_NM1_$t$0 and the second reception normal signal RV_NM2_$t$0, and may be generated due to inter-symbol interference (ISI) with the values RV_NM1_$t$1:$t$N and RV_NM2_$t$1:$t$N of the signals transmitted before the first reception normal signal RV_NM1_$t$0 and the second reception normal signal RV_NM2_$t$0 are received.

The DFE1 103 included in the first receiver operation unit 100 and the DFE3 203 included in the second receiver operation unit 200 may each be the Current-summer DFE among the DFEs using the direct feedback method. In such a case, the Current-summer DFE may refer to a direct feedback DFE that performs an equalization function by directly calibrating a currently received signal using the value of a previously received signal. That is, when enabled in the normal mode, the DFE1 103 may perform an operation of removing the first post-cursor component for the first reception normal signal RV_NM1_$t$0 based on the first previous received value RV_NM1_$t$1 of the first reception normal signal RV_NM1_$t$0, and the DFE3 203 may perform an operation of removing the first post-cursor component for the second reception normal signal RV_NM2_$t$0 based on the first previous received value RV_NM2_$t$1 of the second reception normal signal RV_NM2_$t$0.

The DFE2 104 included in the first receiver operation unit 100 and the DFE4 204 included in the second receiver operation unit 200 may each be the Gm-control DFE among the DFEs using the direct feedback method. In such a case, the Gm-control DFE may refer to a direct feedback DFE that performs an equalization function by adjusting the driving ability of a transistor into which a currently received signal is input, according to the pattern of the value of a previously received signal, that is, by an indirect method.

That is, when enabled by the first method in the normal mode, the DFE2 104 may perform an operation of removing the second to $N^{th}$ post-cursor components for the first reception normal signal RV_NM1_$t$0 based on the second to $N^{th}$ previous received values RV_NM1_$t$2:$t$N of the first reception normal signal RV_NM1_$t$0, and the DFE4 204 may perform an operation of removing the second to Nth post-cursor components for the second reception normal signal RV_NM2_$t$0 based on the second to $N^{th}$ previous received values RV_NM2_$t$2:$t$N of the second reception normal signal RV_NM2_$t$0. When enabled by the second method in the normal mode, the DFE2 104 may perform an operation of removing the first to $N^{th}$ post-cursor components for the first reception normal signal RV_NM1_$t$0 based on the first to $N^{th}$ previous received values RV_NM1_$t$1:$t$N of the first reception normal signal RV_NM1_$t$0, and the DFE4 204 may perform an operation of removing the first to $N^{th}$ post-cursor components for the second reception normal signal RV_NM2_$t$0 based on the first to $N^{th}$ previous received values RV_NM2_$t$1:$t$N of the second reception normal signal RV_NM2_$t$0.

Figure 10A:
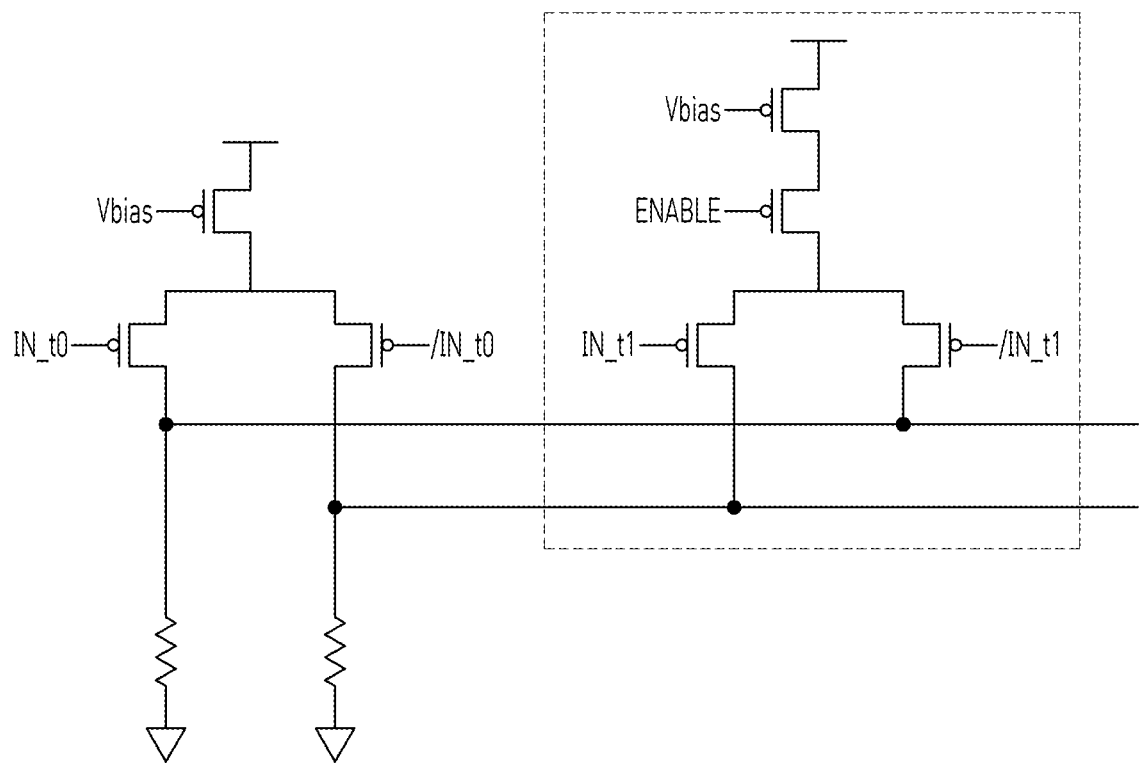
FIGS. 10A and 10B are circuit diagrams of a Current-summer DFE and a Gm-control DFE applied to the receiver circuit in accordance with an embodiment of the present disclosure.

Referring to FIG. 10A together, a circuit configuration of the Current-summer DFE applied to each of the DFE1 103 and the DFE3 203 may be seen. In FIG. 10A, IN_$t$0 and/IN_$t$0 may be one of the first reception normal signal RV_NM1_$t$0 and the second reception normal signal RV_NM2_$t$0, and an inverted signal thereof, respectively. In FIG. 10A, IN_$t$1 and/IN_$t$1 may be the first previous received value RV_NM1_$t$1 or RV_NM2_$t$1 of one of the first reception normal signal RV_NM1_$t$0 and the second reception normal signal RV_NM2_$t$0, and an inverted received value thereof, respectively. In FIG. 10A, ENABLE may be one of the first enable signal EN1 and the second enable signal EN2. As illustrated in FIG. 10A, it may be seen that the Current-summer DFE directly calibrates a currently received signal by using the value of a previously received signal.

Figure 10B:
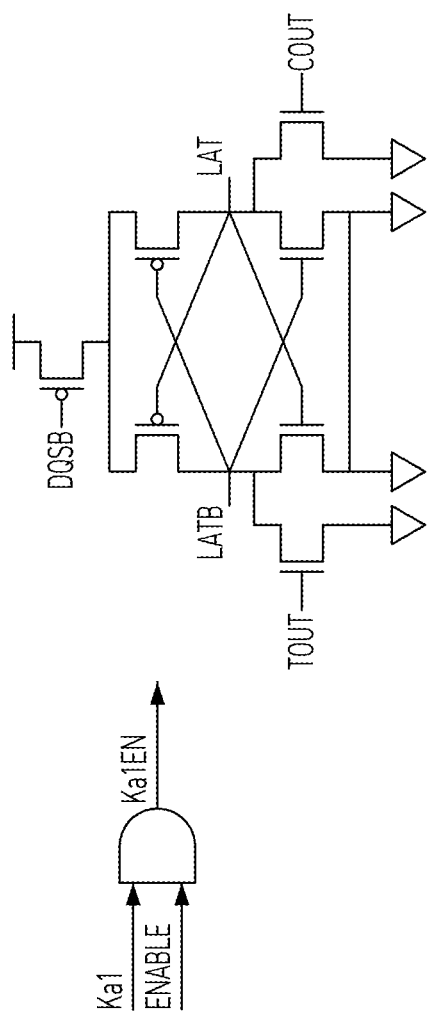
Figure 10B:
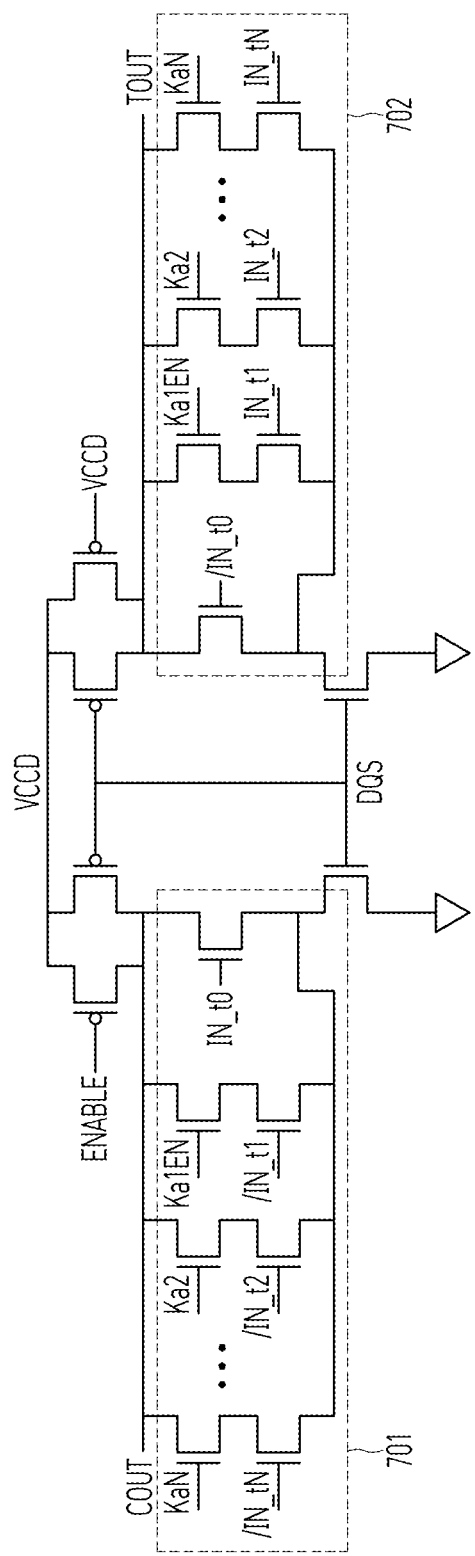

Referring to FIG. 10B together, a circuit configuration of the Gm-control DFE applied to each of the DFE2 104 and the DFE4 204 may be seen. In FIG. 10B, IN_$t$0 and/IN_$t$0 may be one of the first reception normal signal RV_NM1_$t$0 and the second reception normal signal RV_NM2_$t$0, and an inverted signal thereof, respectively. In FIG. 10B, IN_$t$1 . . . IN_$t$N and/IN_$t$1 . . . /IN_$t$N may be the first to $N^{th}$ previous received values RV_NM1_$t$1:$t$N or RV_NM2_$t$1:$t$N of one of the first reception normal signal RV_NM1_$t$0 and the second reception normal signal RV_NM2_$t$0, and inverted received values thereof, respectively. In FIG. 10B, ENABLE may be one of the first enable signal EN1 and the second enable signal EN2. As illustrated in FIG. 10B, it may be seen that the Gm-control DFE performs an equalization function by adjusting the driving ability of a transistor to which a currently received signal is input, according to the pattern of the value of a previously received signal, that is, by an indirect method.

In particular, in FIG. 10B, it may be seen that the first previous received value RV_NM1_t1 or RV_NM2_t1 of one of the first reception normal signal RV_NM1_t0 and the second reception normal signal RV_NM2_t0 is selectively used according to one of the first enable signal EN1 and the second enable signal EN2.

That is, in FIG. 10B, the first enable signal EN1 and the second enable signal EN2 are signals that are activated at a logic low level, when the first enable signal EN1 and the second enable signal EN2 are activated, it may be seen that the first previous received value RV_NM1_t1 or RV_NM2_t1 of one of the first reception normal signal RV_NM1_t0 and the second reception normal signal RV_NM2_t0 is not used for the equalization function. On the other hand, when the first enable signal EN1 and the second enable signal EN2 are deactivated, it may be seen that the first previous received value RV_NM1_t1 or RV_NM2_t1 of one of the first reception normal signal RV_NM1_t0 and the second reception normal signal RV_NM2_t0 is used for the equalization function.

Figure 2:
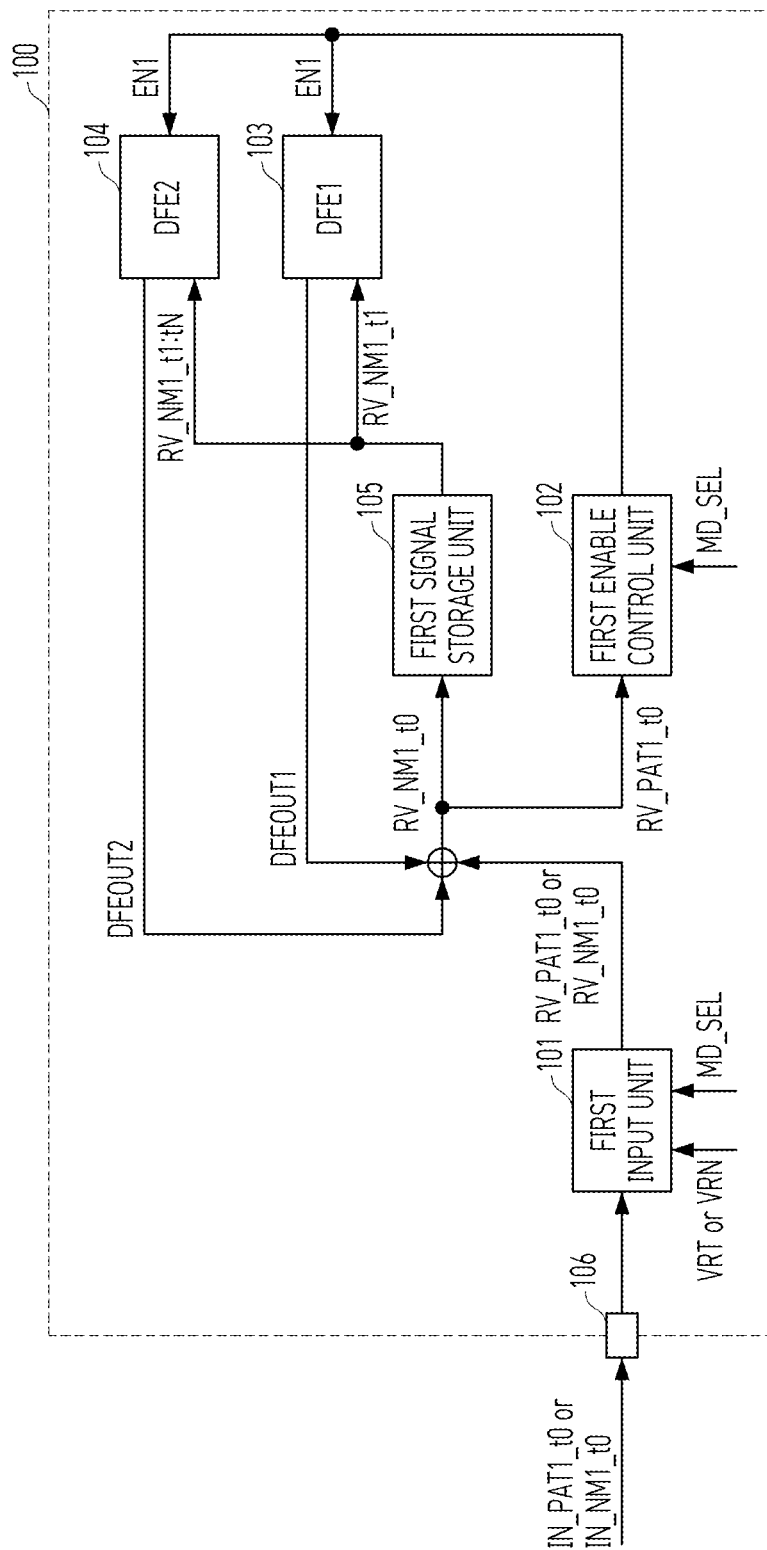
FIG. 2 is a diagram illustrating a first receiver operation unit among components of the receiver circuit in accordance with an embodiment of the present disclosure.

FIG. 2 is a diagram illustrating an example of the first receiver operation unit 100 among the components of the receiver circuit 1 in accordance with an embodiment of the present disclosure. Referring to FIG. 2, the first receiver operation unit 100 illustrated in FIG. 1 described above may include a first input unit 101, a first enable control unit 102, the DFE1 103, the DFE2 104, and a first signal storage unit 105. The first receiver operation unit 100, the first input unit 101, first enable control unit 102, the DFE1 103, the DFE2 104, and the first signal storage unit 105 include all circuits, systems, software, firmware and devices necessary for their respective operations and functions.

The first input unit 101 may receive the first input pattern signal IN_PAT1_t0 applied through the first pad 106 in the training mode, as the first reception pattern signal RV_PAT1_t0 according to a training reference level VRT.

The first input unit 101 may receive the first input normal signal IN_NM1_t0 applied through the first pad 106 in the normal mode entered after escaping from the training mode, as the first reception normal signal RV_NM1_t0 according to a normal reference level VRN.

The first enable control unit 102 may determine whether to activate the first enable signal EN1 according to the result of confirming the value of the first reception pattern signal RV_PAT1_t0 in the training mode.

More specifically, the first enable control unit 102 may activate the first enable signal EN1 in response to entering the training mode, and then may deactivate the first enable signal EN1 in response to confirming that the value of the first reception pattern signal RV_PAT1_t0 is the predetermined pattern value during the period in which the training mode is entered. In this way, the first enable signal EN1 switched from the activated state to the deactivated state during the period in which the training mode is entered may continuously maintain the deactivated state until the first enable signal EN1 enters the training mode again and is switched to the activated state. That is, the first enable signal EN1 switched from the activated state to the deactivated state during the period in which the training mode is entered may continuously maintain the deactivated state during a period in which the normal mode is entered after the training mode.

The first enable control unit 102 may activate the first enable signal EN1 in response to entering the training mode, and then may continuously activate the first enable signal EN1 in response to confirming that the value of the first reception pattern signal RV_PAT1_t0 is not the predetermined pattern value during the period in which the training mode is entered. That is, the first enable signal EN1 continuously maintaining the activated state during the period in which the training mode is entered may continuously maintain the activated state even during the period in which the normal mode is entered after the training mode.

More specifically, the training mode may be divided into a first period and a second period.

In the first period of the training mode, the first input pattern signal IN_PAT1_t0 may be set as a first pattern and applied through the first pad 106.

In the second period of the training mode entered after escaping from the first period of the training mode, the first input pattern signal IN_PAT1_t0 may be set to a second pattern different from the first pattern and applied through the first pad 106.

In summary, the first input pattern signal IN_PAT1_t0 may be input in the form of different patterns in the first period and the second period included in the training mode.

Accordingly, in the first period of the training mode, the first input unit 101 may receive the first input pattern signal IN_PAT1_t0 with the first pattern as the first reception pattern signal RV_PAT1_t0 according to a first training reference level.

In the second period of the training mode, the first input unit 101 may receive the first input pattern signal IN_PAT1_t0 with the second pattern as the first reception pattern signal RV_PAT1_t0 according to a second training reference level different from the first training reference level.

Depending on the embodiment, the first pattern of the first input pattern signal IN_PAT1_t0 may be a pattern including at least one '1' value between a plurality of '0' values. As the first pattern is set in this way, the first input unit 101 may set the first training reference level to be higher than the normal reference level VRN by a predetermined level. That is, in the first period of the training mode, the first input unit 101 may determine the logic level of the first input pattern signal IN_PAT1_t0 through the first training reference level set to be higher than the normal reference level VRN by the predetermined level, and receive the first input pattern signal IN_PAT1_t0 as the first reception pattern signal RV_PAT1_t0.

The second pattern of the first input pattern signal IN_PAT1_t0 may be a pattern including at least one '0' value between a plurality of '1' values. As the second pattern is set in this way, the first input unit 101 may set the second training reference level to be lower than the normal reference level VRN by the predetermined level. That is, in the second period of the training mode, the first input unit 101 may determine the logic level of the first input pattern signal IN_PAT1_t0 through the second training reference level set to be lower than the normal reference level VRN by the predetermined level, and receive the first input pattern signal IN_PAT1_t0 as the first reception pattern signal RV_PAT1_t0.

In summary, the training reference level VRT may be set to one of a level higher than the normal reference level VRN by the predetermined level, and a level lower than the normal reference level VRN by the predetermined level according to a pattern of the first input pattern signal IN_PAT1_t0.

According to the operation of the first input unit 101 as described above, the first enable control unit 102 may activate the first enable signal EN1 in response to entering the first period of the training mode, and deactivate the first enable signal EN1 when a first confirmation number is a predetermined number. The first confirmation number may be obtained by adding a counted value of the number of '1' values included in the first reception pattern signal RV_PAT1_t0 in the first period of the training mode and a counted value of the number of '0' values included in the first reception pattern signal RV_PAT1_t0 in the second period of the training mode. When the first confirmation number is different from the predetermined number, the first enable control unit 102 may continuously activate the first enable signal EN1.

The DFE1 103 may operate in the activation period of the first enable signal EN1, and remove the first post-cursor component for the first reception normal signal RV_NM1_t0 by directly calibrating the currently received value RV_NM1_t0 based on the first previous received value RV_NM1_t1 of the first reception normal signal RV_NM1_t0. That is, a signal DFEOUT1 output from the DFE1 103 may be added to the first reception normal signal RV_NM1_t0, so that the first post-cursor component for the first reception normal signal RV_NM1_t0 may be removed.

When the first enable signal EN1 is in an activated state, the DFE2 104 may remove the second to $N^{th}$ post-cursor components for the first reception normal signal RV_NM1_t0 by adjusting the driving abilities of first input transistors 701 and 702 (see FIG. 10B), to which the currently received value RV_NM1_t0 is applied, according to patterns of the second to $N^{th}$ previous received values RV_NM1_t2:tN of the first reception normal signal RV_NM1_t0. That is, a signal DFEOUT2 output from the DFE2 104 may be added to the first reception normal signal RV_NM1_t0, so that the second to $N^{th}$ post-cursor components for the first reception normal signal RV_NM1_t0 may be removed.

When the first enable signal EN1 is in a deactivated state, the DFE2 104 may remove the first to $N^{th}$ post-cursor components for the first reception normal signal RV_NM1_t0 by adjusting the driving abilities of the first input transistors 701 and 702 (see FIG. 10B), to which the currently received value RV_NM1_t0 is applied, according to patterns of the first to $N^{th}$ previous received values RV_NM1_t1:tN of the first reception normal signal RV_NM1_t0. That is, the signal DFEOUT2 output from the DFE2 104 may be added to the first reception normal signal RV_NM1_t0, so that the first to $N^{th}$ post-cursor components for the first reception normal signal RV_NM1_t0 may be removed.

In the order in which the first reception normal signal RV_NM1_t0 is input, the first signal storage unit 105 may store up to N first reception normal signals RV_NM1_t0. Accordingly, the first signal storage unit 105 may store the first to $N^{th}$ previous received values RV_NM1_t1:tN of the first reception normal signal RV_NM1_t0. That is, when the DFE1 103 and the DFE2 104 perform the equalization function, the first to $N^{th}$ previous received values RV_NM1_t1:tN stored in the first signal storage unit 105 may be used.

Figure 3:
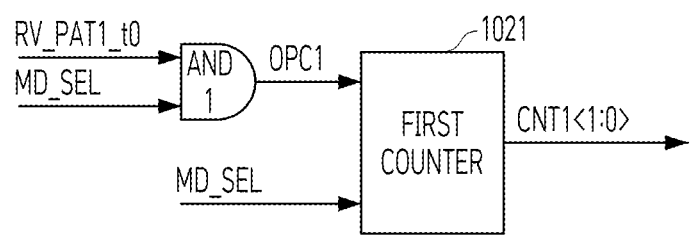
FIG. 3 is a diagram illustrating a first enable control unit among components of the first receiver operation unit illustrated in FIG. 2.
Figure 3:
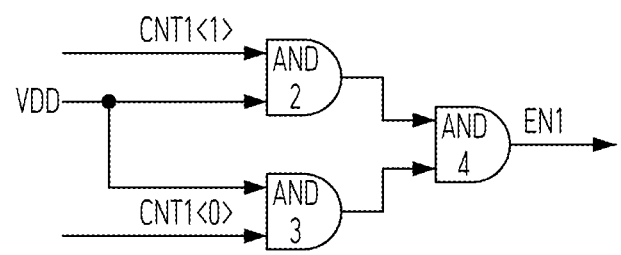

FIG. 3 is a diagram illustrating the first enable control unit 102 among the components of the first receiver operation unit 100 illustrated in FIG. 2.

Referring to FIG. 3, the first enable control unit 102 illustrated in FIG. 2 described above may include first to fourth AND gates AND1 to AND4 and a first counter 1021.

Specifically, the first AND gate AND1 included in the first enable control unit 102 may generate a first counting clock signal OPC1 in response to the mode selection signal MD_SEL and the first reception pattern signal RV_PAT1_t0. That is, the first AND gate AND1 may output the first reception pattern signal RV_PAT1_t0 as the first counting clock signal OPC1 in the training mode in which the mode selection signal MD_SEL is set to a logic high level. The first AND gate AND1 may block the input of the first reception pattern signal RV_PAT1_t0 in the normal mode in which the mode selection signal MD_SEL is set at a logic low level.

The first counter 1021 included in the first enable control unit 102 may up-count a first counting value CNT1<1:0> in response to the first counting clock signal OPC1. For example, the first counter 1021 may up-count the first counting value CNT1<1:0> according to the number of times the first counting clock signal OPC1 transitions from a logic low level to a logic high level.

The first counter 1021 may initialize the first counting value CNT1<1:0> in response to entering the training mode. That is, the first counter 1021 may initialize the first counting value CNT1<1:0> in response to a transition of the mode selection signal MD_SEL from a logic low level to a logic high level. For example, the first counting value CNT1<1:0> may be initialized to '00'.

Figure 7:
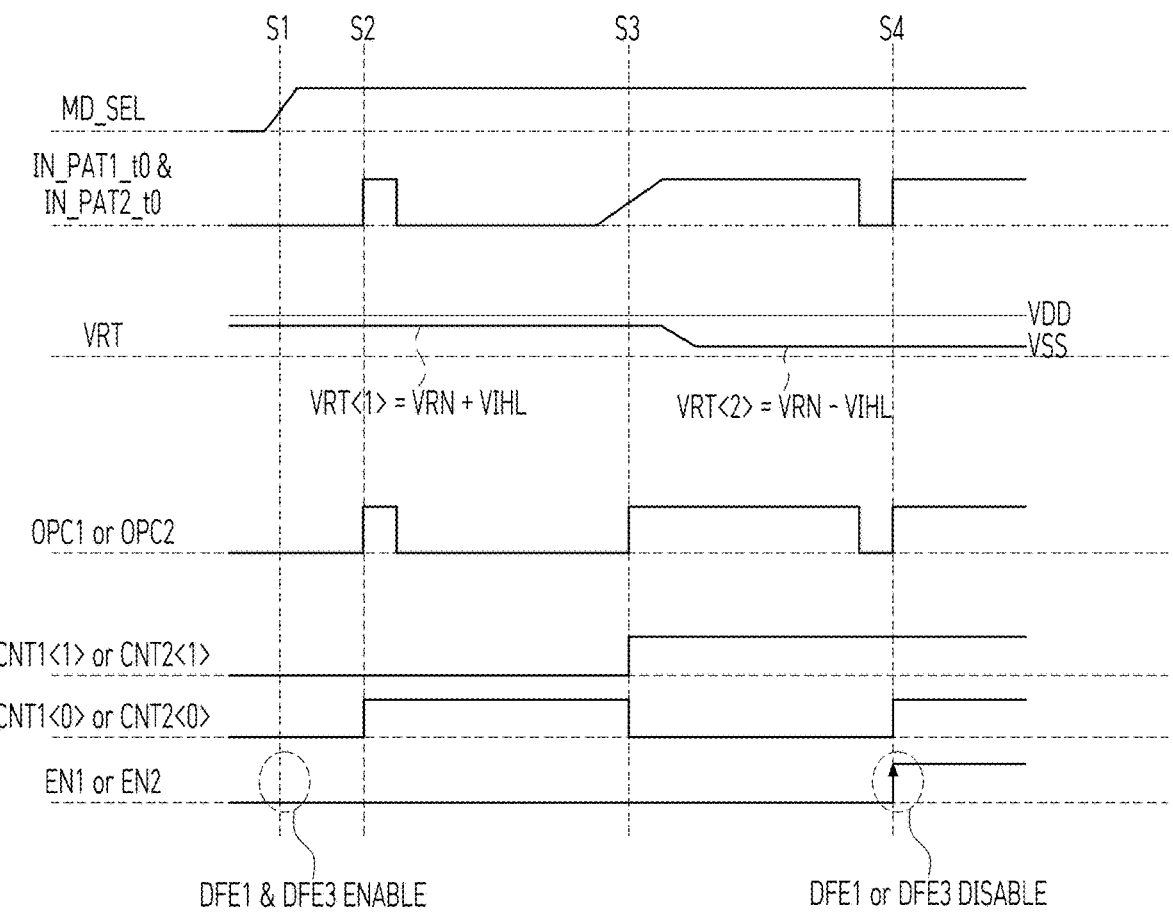
FIG. 7 is a diagram illustrating a training operation performed by the receiver circuit in accordance with an embodiment of the present disclosure.

The second AND gate AND2, the third AND gate AND3, and the fourth AND gate AND4 included in the first enable control unit 102 may substantially maintain the first enable signal EN1 at a logic low level in response to the fact that the first counting value CNT1<0:1> is less than a predetermined value, and may allow the first enable signal EN1 to transition from a logic low level to a logic high level in response to the fact that the first counting value CNT1<0:1> is the predetermined value. For example, as illustrated in FIG. 7, the first enable signal EN1 may transition from a logic low level to a logic high level in response to the fact that the first counting value CNT1<1:0> is '11'.

Figure 4:
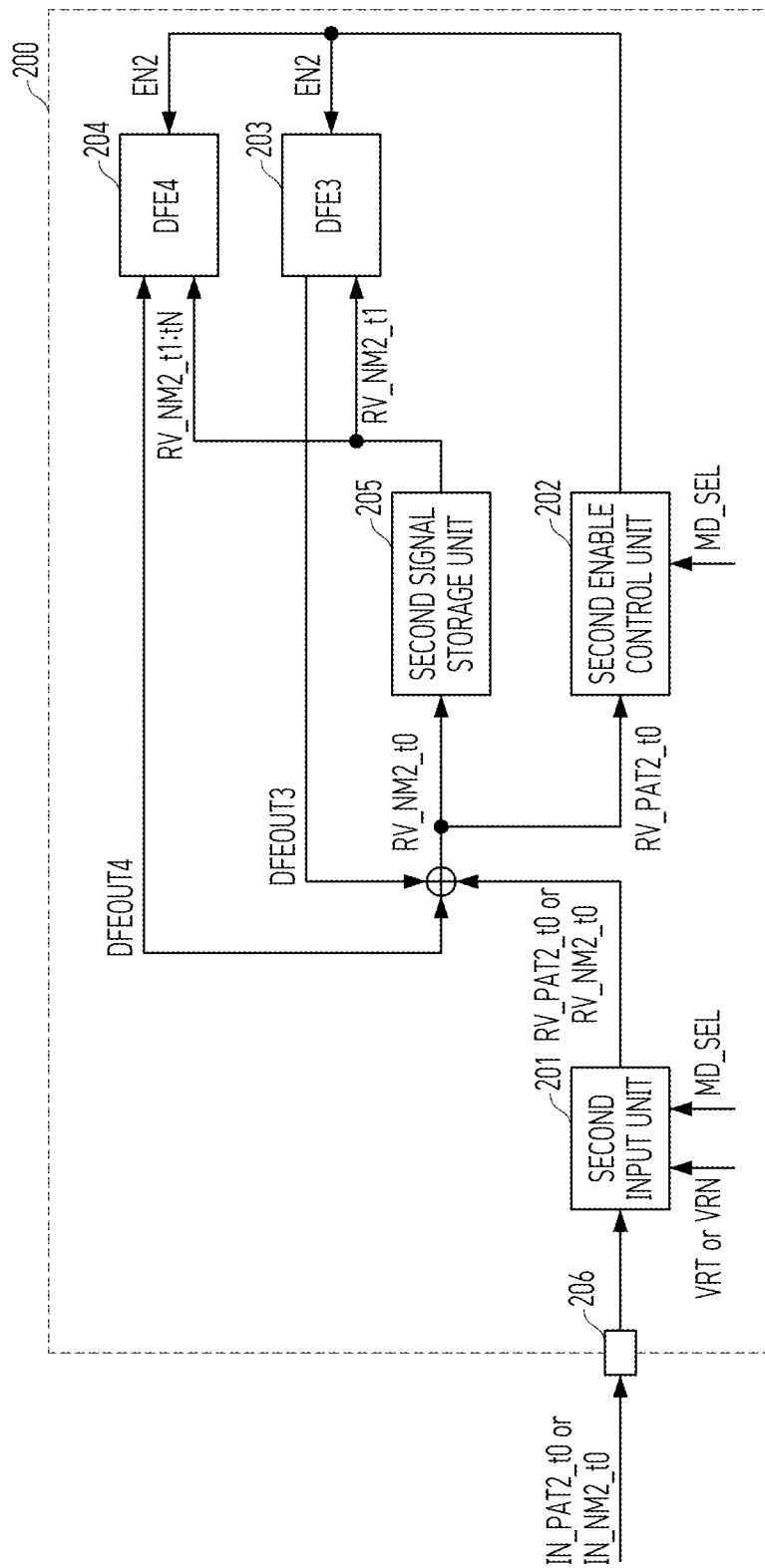
FIG. 4 is a diagram illustrating a second receiver operation unit among the components of the receiver circuit in accordance with an embodiment of the present disclosure.

FIG. 4 is a diagram illustrating the second receiver operation unit 200 among the components of the receiver circuit 1 in accordance with an embodiment of the present disclosure.

Referring to FIG. 4, the second receiver operation unit 200 illustrated in FIG. 1 described above may include a second input unit 201, a second enable control unit 202, the DFE3 203, the DFE4 204, and a second signal storage unit 205. The second receiver operation unit 200, the second input unit 201, the second enable control unit 202, the DFE3 203, the DFE4 204, and the second signal storage unit 205, include all circuits, systems, software, firmware and devices necessary for their respective operations and functions.

The second input unit 201 may receive the second input pattern signal IN_PAT2_t0 applied through the second pad 206 in the training mode, as the second reception pattern signal RV_PAT2_t0 according to the training reference level VRT.

The second input unit 201 may receive the second input normal signal IN_NM2_t0 applied through the second pad 206 in the normal mode entered after escaping from the training mode, as the second reception normal signal RV_NM2_t0 according to the normal reference level VRN.

The second enable control unit 202 may determine whether to activate the second enable signal EN2 according to the result of confirming the value of the second reception pattern signal RV_PAT2_t0 in the training mode.

More specifically, the second enable control unit 202 may activate the second enable signal EN2 in response to entering the training mode, and then may deactivate the second enable signal EN2 in response to confirming that the value of the second reception pattern signal RV_PAT2_t0 is the predetermined pattern value during the period in which the training mode is entered. In this way, the second enable signal EN2 switched from the activated state to the deactivated state during the period in which the training mode is entered may continuously maintain the deactivated state until the second enable signal EN2 enters the training mode again and is switched to the activated state. That is, the second enable signal EN2 switched from the activated state to the deactivated state during the period in which the training mode is entered may continuously maintain the deactivated state during the period in which the normal mode is entered after the training mode.

The second enable control unit 202 may activate the second enable signal EN2 in response to entering the training mode, and then may continuously activate the second enable signal EN2 in response to confirming that the value of the second reception pattern signal RV_PAT2_$t0$ is not the predetermined pattern value during the period in which the training mode is entered. That is, the second enable signal EN2 continuously maintaining the activated state during the period in which the training mode is entered may continuously maintain the activated state even during the period in which the normal mode is entered after the training mode.

More specifically, the training mode may be divided into a first period and a second period.

In the first period of the training mode, the second input pattern signal IN_PAT2_$t0$ may be set as a first pattern and applied through the second pad 206.

In the second period of the training mode entered after escaping from the first period of the training mode, the second input pattern signal IN_PAT2_$t0$ may be set to a second pattern different from the first pattern and applied through the second pad 206.

In summary, the second input pattern signal IN_PAT2_$t0$ may be input in the form of different patterns in the first period and the second period included in the training mode.

Accordingly, in the first period of the training mode, the second input unit 201 may receive the second input pattern signal IN_PAT2_$t0$ with the first pattern as the second reception pattern signal RV_PAT2_$t0$ according to the first training reference level.

In the second period of the training mode, the second input unit 201 may receive the second input pattern signal IN_PAT2_$t0$ with the second pattern as the second reception pattern signal RV_PAT2_$t0$ according to the second training reference level different from the first training reference level.

Depending on the embodiment, the first pattern of the second input pattern signal IN_PAT2_$t0$ may be a pattern including at least one '1' value between a plurality of '0' values. As the first pattern is set in this way, the second input unit 201 may set the first training reference level to be higher than the normal reference level VRN by a predetermined level. That is, in the first period of the training mode, the second input unit 201 may determine the logic level of the second input pattern signal IN_PAT2_$t0$ through the first training reference level set to be higher than the normal reference level VRN by the predetermined level, and receive the second input pattern signal IN_PAT2_$t0$ as the second reception pattern signal RV_PAT2_$t0$.

The second pattern of the second input pattern signal IN_PAT2_$t0$ may be a pattern including at least one '0' value between a plurality of '1' values. As the second pattern is set in this way, the second input unit 201 may set the first training reference level to be lower than the normal reference level VRN by the predetermined level. That is, in the second period of the training mode, the second input unit 201 may determine the logic level of the second input pattern signal IN_PAT2_$t0$ through the second training reference level set to be lower than the normal reference level VRN by the predetermined level, and receive the second input pattern signal IN_PAT2_$t0$ as the second reception pattern signal RV_PAT2_$t0$.

In summary, the training reference level VRT may be set to any level higher than the normal reference level VRN by the predetermined level and a level lower than the normal reference level VRN by the predetermined level according to a pattern of the second input pattern signal IN_PAT2_$t0$.

According to the operation of the second input unit 201 as described above, the second enable control unit 202 may activate the second enable signal EN2 in response to entering the first period of the training mode, and deactivate the second enable signal EN2 when a second confirmation number is a predetermined number. The second confirmation number may be obtained by adding a counted value of the number of '1' values included in the second reception pattern signal RV_PAT2_$t0$ in the first period of the training mode, and a counted value of the number of '0' values included in the second reception pattern signal RV_PAT2_$t0$ in the second period of the training mode. When the second confirmation number is different from the predetermined number, the second enable control unit 202 may continuously activate the second enable signal EN2.

The DFE3 203 may operate in the activation period of the second enable signal EN2, and remove the first post-cursor component for the second reception normal signal RV_NM2_$t0$ by directly calibrating the currently received value RV_NM2_$t0$ based on the first previous received value RV_NM2_$t1$ of the second reception normal signal RV_NM2_$t0$. That is, a signal DFEOUT3 output from the DFE3 203 may be added to the second reception normal signal RV_NM2_$t0$, so that the first post-cursor component for the second reception normal signal RV_NM2_$t0$ may be removed.

When the second enable signal EN2 is in an activated state, the DFE4 204 may remove the second to $N^{th}$ post-cursor components for the second reception normal signal RV_NM2_$t0$ by adjusting the driving abilities of second input transistors 701 and 702 (see FIG. 10B), to which the currently received value RV_NM2_$t0$ is applied, according to patterns of the second to $N^{th}$ previous received values RV_NM2_$t2:tN$ of the second reception normal signal RV_NM2_$t0$. That is, a signal DFEOUT4 output from the DFE4 204 may be added to the second reception normal signal RV_NM2_$t0$, so that the second to $N^{th}$ post-cursor components for the second reception normal signal RV_NM2_$t0$ may be removed.

When the second enable signal EN2 is in a deactivated state, the DFE4 204 may remove the first to $N^{th}$ post-cursor components for the second reception normal signal RV_NM2_$t0$ by adjusting the driving abilities of the second input transistors 701 and 702 (see FIG. 10B), to which the currently received value RV_NM2_$t0$ is applied, according to patterns of the first to $N^{th}$ previous received values RV_NM2_$t1:tN$ of the second reception normal signal RV_NM2_$t0$. That is, the signal DFEOUT4 output from the DFE4 204 may be added to the second reception normal signal RV_NM2_$t0$, so that the first to $N^{th}$ post-cursor components for the second reception normal signal RV_NM2_$t0$ may be removed.

In the order in which the second reception normal signal RV_NM2_$t0$ is input, the second signal storage unit 205 may store up to N second reception normal signals RV_NM2_$t0$. Accordingly, the second signal storage unit 205 may store the first to $N^{th}$ previous received values RV_NM2_$t1:tN$ of the second reception normal signal RV_NM2_t0. That is, when the DFE3 203 and the DFE4 204 perform the equalization function, the first to $N^{th}$ previous received values RV_NM1_t1:tN stored in the second signal storage unit 205 may be used.

Figure 5:
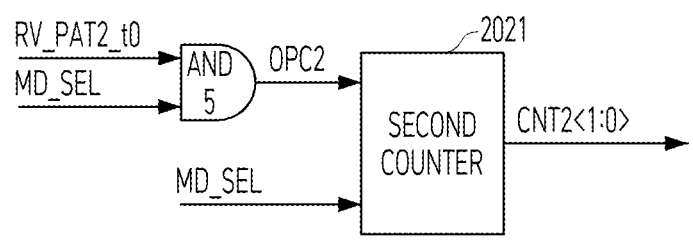
FIG. 5 is a diagram illustrating a second enable control unit among components of the second receiver operation unit illustrated in FIG. 2.
Figure 5:
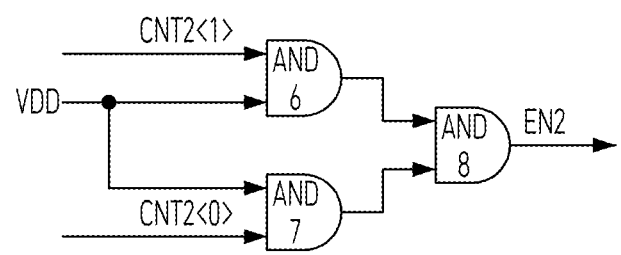

FIG. 5 is a diagram illustrating the second enable control unit 202 among the components of the second receiver operation unit 200 illustrated in FIG. 2.

Referring to FIG. 5, the second enable control unit 202 illustrated in FIG. 4 described above may include fifth to eighth AND gates AND5 to AND8 and a second counter 2021.

Specifically, the fifth AND gate AND5 included in the second enable control unit 202 may generate a second counting clock signal OPC2 in response to the mode selection signal MD_SEL and the second reception pattern signal RV_PAT2_t0. That is, the fifth AND gate AND5 may output the second reception pattern signal RV_PAT2_t0 as the second counting clock signal OPC2 in the training mode in which the mode selection signal MD_SEL is set to a logic high level. The fifth AND gate AND5 may block the input of the second reception pattern signal RV_PAT2_t0 in the normal mode in which the mode selection signal MD_SEL is set to a logic low level.

The second counter 2021 included in the second enable control unit 202 may up-count a second counting value CNT2<1:0> in response to the second counting clock signal OPC2. For example, the second counter 2021 may up-count the second counting value CNT2<1:0> according to the number of times the second counting clock signal OPC2 transitions from a logic low level to a logic high level.

The second counter 2021 may initialize the second counting value CNT2<1:0> in response to entering the training mode. That is, the second counter 2021 may initialize the second counting value CNT2<0:1> in response to a transition of the mode selection signal MD_SEL from a logic low level to a logic high level. For example, the second counting value CNT2<0:1> may be initialized to '00'.

The sixth AND gate AND6, the seventh AND gate AND7, and the eighth AND gate AND8 included in the second enable control unit 202 may substantially maintain the second enable signal EN2 at a logic low level in response to the fact that the second counting value CNT2<0:1> is less than the predetermined value, and may allow the second enable signal EN2 to transition from a logic low level to a logic high level in response to the fact that the second counting value CNT2<0:1> is the predetermined value. For example, as illustrated in FIG. 7, the second enable signal EN2 may transition from a logic low level to a logic high level in response to the fact that the second counting value CNT2<0:1> is '11'.

Figure 6:
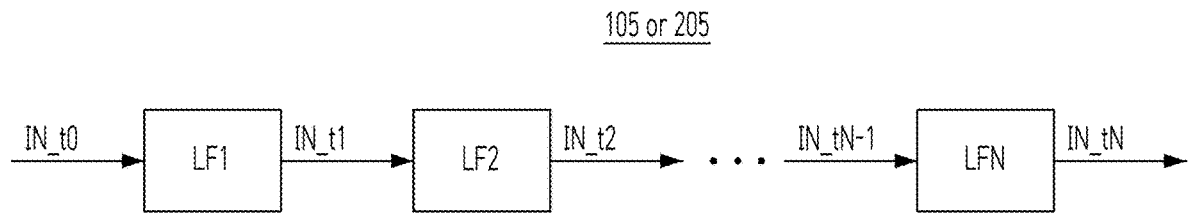
FIG. 6 is a diagram illustrating a first signal storage unit or a second signal storage unit among the components of the receiver circuit in accordance with an embodiment of the present disclosure.

FIG. 6 is a diagram illustrating the first signal storage unit 105 or the second signal storage unit 205 among the components of the receiver circuit 1 in accordance with an embodiment of the present disclosure.

Referring to FIG. 6, the first signal storage unit 105 illustrated in FIG. 2 described above or the second signal storage unit 205 illustrated in FIG. 4 described above may include first to $N^{th}$ signal storage latches LF1 to LFN.

The currently received signal IN_t0 input to the first signal storage unit 105 or the second signal storage unit 205 may be stored in the first signal storage latch LF1 among the N signal storage latches LF1 to LFN. In this way, at the time point when the currently received signal IN_t0 is input to the first signal storage latch LF1, the signal stored in the first signal storage latch LF1 may be transmitted to the second signal storage latch LF2 as the first previously received signal IN_t1 and may be stored. Likewise, at the time point when the first previous received signal IN_t1 is input to the second signal storage latch LF2, the signal stored in the second signal storage latch LF2 may be transmitted to the third signal storage latch LF3 as the second previous received signal IN_t2 and may be stored. In this way, maximum N received signals IN_t0:tN may be stored in each of the N signal storage latches LF1 to LFN.

The currently received signal IN_t0 may be the first reception normal signal RV_NM1_t0 or the second reception normal signal RV_NM2_t0. The first to Nth previous received signals IN_t1:tN may be the first to $N^{th}$ previous received signals RV_NM1_t1:Tn or RV_NM2_t1:tN of each of the first reception normal signal RV_NM1_t0 or the second reception normal signal RV_NM2_t0.

FIG. 7 is a diagram illustrating a training operation performed in the receiver circuit 1 in accordance with an embodiment of the present disclosure.

Referring to FIG. 7, at the time point S1, the mode selection signal MD_SEL may transition from a logic low level to a logic high level and the training mode may be entered.

The first counting value CNT1<0:1> and the second counting value CNT2<0:1> may all be initialized while entering the training mode at the time point S1, and accordingly, the first enable signal EN1 and the second enable signal EN2 may all be activated to a logic low level. In this way, in response to the fact that the first enable signal EN1 and the second enable signal EN2 are all activated to a logic low level at the time point S1, the DFE1 103 included in the first receiver operation unit 100 and the DFE3 203 included in the second receiver operation unit 200 may all be set to an enabled state.

The time point S1 to the time point S3 may be the first period of the training mode.

In the first period of the training mode, each of the first input pattern signal IN_PAT1_t0 and the second input pattern signal IN_PAT2_t0 may be set to the first pattern (when the first pattern is a pattern with at least one '1' value among a plurality of '0' values) and applied.

The logic level of each of the first input pattern signal IN_PAT1_t0 and the second input pattern signal IN_PAT2_t0 may be determined through a first training reference level VRT<1> higher than the normal reference level VRN by a predetermined level VIHL. Then, whether to up-count the value of the first counting value CNT1<0:1> or the second counting value CNT2<0:1> may be determined according to whether the determined logic level has the first pattern, that is, according to whether each of the first reception pattern signal RV_PAT1_t0 and the second reception pattern signal RV_PAT2_t0 has the first pattern.

In the drawing, in the first period of the training mode, the first reception pattern signal RV_PAT1_t0 and the second reception pattern signal RV_PAT2_t0 are all received with the first pattern. Accordingly, the first counting value CNT1<0:1> and the second counting value CNT2<0:1> may all be up-counted from '00' to '01'.

At the time point S3, the first period of the training mode may end and simultaneously the second period may be entered. Accordingly, the first input pattern signal IN_PAT1_t0 and the second input pattern signal IN_PAT2_t0 may be changed from the first pattern to the second pattern, and thus the first counting value CNT1<0:1> and the second counting value CNT2<0:1> may be up-counted from '01' to '10', respectively.

In this way, the time point S3, at which the first period of the training mode ends and simultaneously the second period is entered, may be a preset time point. For example, a predetermined time after the time point S1 or a time point when toggling of a system clock (not illustrated) determined in advance is repeated may be set as the time point S3. Therefore, an operation, in which the first counting value CNT1<0:1> and the second counting value CNT2<0:1> are up-counted from '01' to '10', respectively, due to a change of the first input pattern signal IN_PAT1_t0 and the second input pattern signal IN_PAT2_t0 from the first pattern to the second pattern at the time point S3, may be an operation already reflected in the design of the first receiver operation unit 100 and the second receiver operation unit 200.

The time point S3 to the time point S4 may be the second period of the training mode.

In the second period of the training mode, each of the first input pattern signal IN_PAT1_t0 and the second input pattern signal IN_PAT2_t0 may be set to the second pattern (when the second pattern is a pattern with at least one '0' value among a plurality of '1' values) and applied.

The logic level of each of the first input pattern signal IN_PAT1_t0 and the second input pattern signal IN_PAT2_t0 may be determined through a second training reference level VRT<2> lower than the normal reference level VRN by the predetermined level VIHL. Then, whether to up-count the value of the first counting value CNT1<0:1> and the second counting value CNT2<0:1> may be determined according to whether the determined logic level has the second pattern, that is, according to whether each of the first reception pattern signal RV_PAT1_t0 and the second reception pattern signal RV_PAT2_t0 has the second pattern.

In the drawing, in the second period of the training mode, the first reception pattern signal RV_PAT1_t0 and the second reception pattern signal RV_PAT2_t0 are all received with the second pattern. Accordingly, the first counting value CNT1<0:1> and the second counting value CNT2<0:1> may all be up-counted from '10' to '11'.

In this way, when the second period of the training mode ends at the time point S4, the first counting value CNT1<0:1> and the second counting value CNT2<0:1> may each be '11' being a predetermined value. Accordingly, at the time point S4, each of the first enable signal EN1 and the second enable signal EN2 may transition from a logic low level being an activated state to a logic high level being a deactivated state.

That is, in response to the fact that the first enable signal EN1 and the second enable signal EN2 are all deactivated to a logic high level at the time point S4, the DFE1 103 included in the first receiver operation unit 100 and the DFE3 203 included in the second receiver operation unit 200 may all be set to a disabled state.

Unlike the drawing, in another embodiment, when in the first period of the training mode, the first reception pattern signal RV_PAT1_t0 is received with the first pattern and the second reception pattern signal RV_PAT2_t0 is received without the first pattern, the first counting value CNT1<0:1> may be up-counted from '00' to '01', but the second counting value CNT2<0:1> may substantially maintain '00'. In such a case, even though the first counting value CNT1<0:1> and the second counting value CNT2<0:1> are all up-counted at each of the time point S3 and the time point S4, only the first counting value CNT1<0:1> may be '11', and the second counting value CNT2<0:1> may be '10'. Accordingly, the first enable signal EN1 may transition from a logic low level being an activated state to a logic high level being a deactivated state, but the second enable signal EN2 may substantially maintain a logic low level being an activated state. That is, at the time point when the second period of the training mode ends, the DFE1 103 included in the first receiver operation unit 100 may be set to a disabled state, but the DFE3 203 included in the second receiver operation unit 200 may substantially maintain an enabled state.

Figure 8:
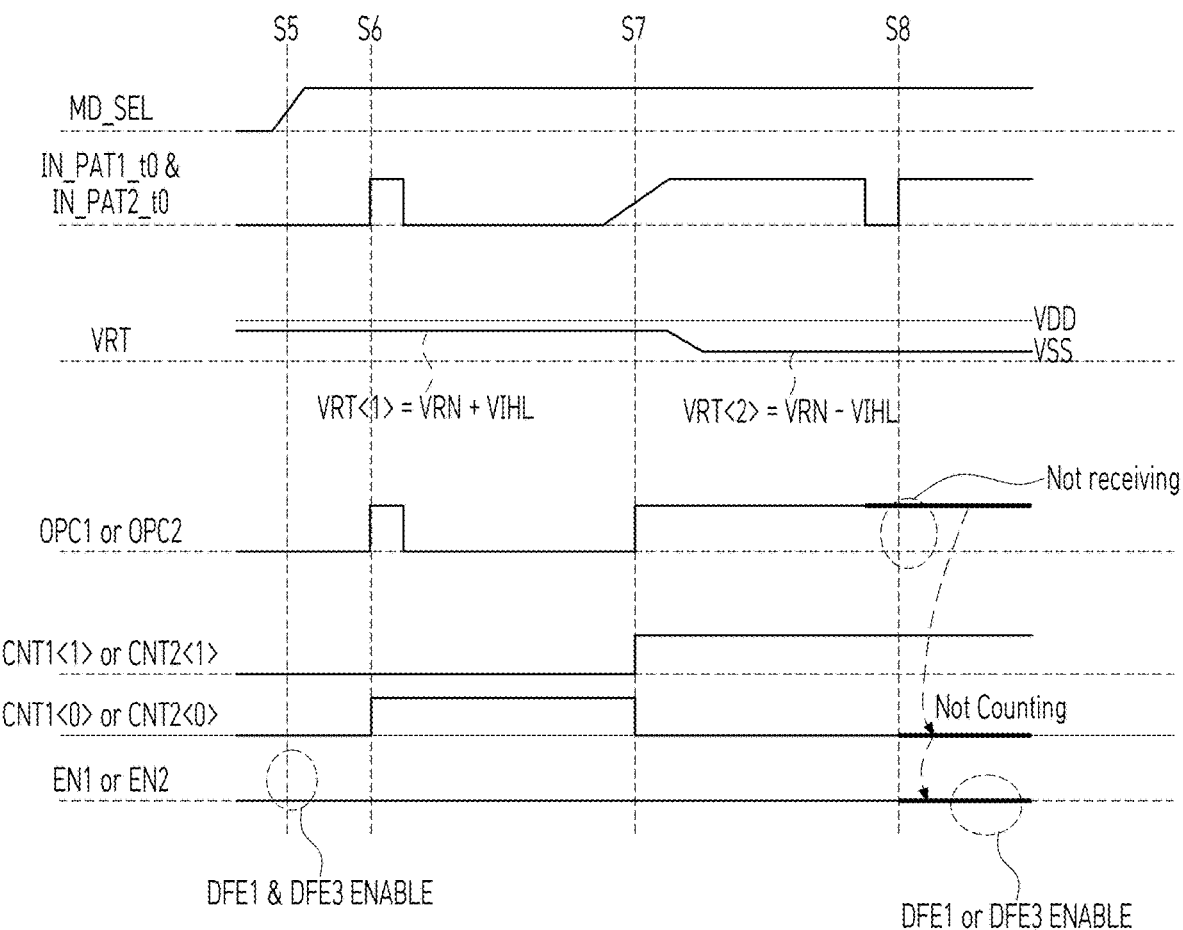
FIG. 8 is a diagram illustrating another training operation performed by the receiver circuit in accordance with an embodiment of the present disclosure.

FIG. 8 is a diagram illustrating another example of the training operation performed in the receiver circuit 1 in accordance with an embodiment of the present disclosure.

Referring to FIG. 8, at the time point S5, the mode selection signal MD_SEL may transition from a logic low level to a logic high level and the training mode may be entered.

The first counting value CNT1<0:1> and the second counting value CNT2<0:1> may all be initialized while entering the training mode at the time point S5, and accordingly, the first enable signal EN1 and the second enable signal EN2 may all be activated to a logic low level. In this way, in response to the fact that the first enable signal EN1 and the second enable signal EN2 are all activated to a logic low level at the time point S5, the DFE1 103 included in the first receiver operation unit 100 and the DFE3 203 included in the second receiver operation unit 200 may all be set to an enabled state.

The time point S5 to the time point S7 may be the first period of the training mode.

In the first period of the training mode, each of the first input pattern signal IN_PAT1_t0 and the second input pattern signal IN_PAT2_t0 may be set to the first pattern (when the first pattern is a pattern with at least one '1' value among a plurality of '0' values) and applied.

The logic level of each of the first input pattern signal IN_PAT1_t0 and the second input pattern signal IN_PAT2_t0 may be determined through the first training reference level VRT<1> higher than the normal reference level VRN by the predetermined level VIHL. Then, whether to up-count the value of the first counting value CNT1<0:1> or the second counting value CNT2<0:1> may be determined according to whether the determined logic level has the first pattern, that is, according to whether each of the first reception pattern signal RV_PAT1_t0 and the second reception pattern signal RV_PAT2_t0 has the first pattern.

In the drawing, in the first period of the training mode, the first reception pattern signal RV_PAT1_t0 and the second reception pattern signal RV_PAT2_t0 are all received with the first pattern. Accordingly, the first counting value CNT1<0:1> and the second counting value CNT2<0:1> may all be up-counted from '00' to '01'.

At the time point S7, the first period of the training mode may end and simultaneously the second period may be entered. Accordingly, the first input pattern signal IN_PAT1_t0 and the second input pattern signal IN_PAT2_t0 may be changed from the first pattern to the second pattern, and thus the first counting value CNT1<0:1> and the second counting value CNT2<0:1> may be up-counted from '01' to '10', respectively.

In this way, the time point S7, at which the first period of the training mode ends and simultaneously the second period is entered, may be a preset time point. For example, a predetermined time after the time point S5 or a time point when toggling of a system clock (not illustrated) determined in advance is repeated may be set as the time point S7. Therefore, an operation, in which the first counting value CNT1<0:1> and the second counting value CNT2<0:1> are up-counted from '01' to '10', respectively, due to a change of the first input pattern signal IN_PAT1_t0 and the second input pattern signal IN_PAT2_t0 from the first pattern to the second pattern at the time point S7, may be an operation already reflected in the design of the first receiver operation unit 100 and the second receiver operation unit 200.

The time point S7 to the time point S8 may be the second period of the training mode.

In the second period of the training mode, each of the first input pattern signal IN_PAT1_t0 and the second input pattern signal IN_PAT2_t0 may be set to the second pattern (when the second pattern is a pattern with at least one '0' value among a plurality of '1' values) and applied.

The logic level of each of the first input pattern signal IN_PAT1_t0 and the second input pattern signal IN_PAT2_t0 may be determined through the second training reference level VRT<2> lower than the normal reference level VRN by the predetermined level VIHL. Then, whether to up-count the value of the first counting value CNT1<0:1> and the second counting value CNT2<0:1> may be determined according to whether the determined logic level has the second pattern, that is, according to whether each of the first reception pattern signal RV_PAT1_t0 and the second reception pattern signal RV_PAT2_t0 has the second pattern.

In the drawing, in the second period of the training mode, the first reception pattern signal RV_PAT1_t0 and the second reception pattern signal RV_PAT2_t0 are all input without the second pattern (Not Receiving). Accordingly, the first counting value CNT1<0:1> and the second counting value CNT2<0:1> may all not be up-counted from '10' (Not Counting) and substantially maintain '10'.

In this way, when the second period of the training mode ends at the time point S8, the first counting value CNT1<0:1> and the second counting value CNT2<0:1> may each be '10' different from the predetermined value. Accordingly, at the time point S8, each of the first enable signal EN1 and the second enable signal EN2 may substantially maintain a logic low level being an activated state.

That is, in response to the fact that all of the first enable signal EN1 and the second enable signal EN2 are continuously activated to a logic low level at the time point S8, the DFE1 103 included in the first receiver operation unit 100 and the DFE3 203 included in the second receiver operation unit 200 may all be continuously set to an enabled state.

Unlike the drawing, in another embodiment when in the second period of the training mode, the first reception pattern signal RV_PAT1_t0 is received with the second pattern and the second reception pattern signal RV_PAT2_t0 is received without the second pattern, the first counting value CNT1<0:1> may be up-counted from '10' to '11', but the second counting value CNT2<0:1> may substantially maintain '10'. Accordingly, the first enable signal EN1 may transition from a logic low level being an activated state to a logic high level being a deactivated state, but the second enable signal EN2 may substantially maintain a logic low level being an activated state. That is, at the time point when the second period of the training mode ends, the DFE1 103 included in the first receiver operation unit 100 may be set to a disabled state, but the DFE3 203 included in the second receiver operation unit 200 may substantially maintain an enabled state.

Figure 9:
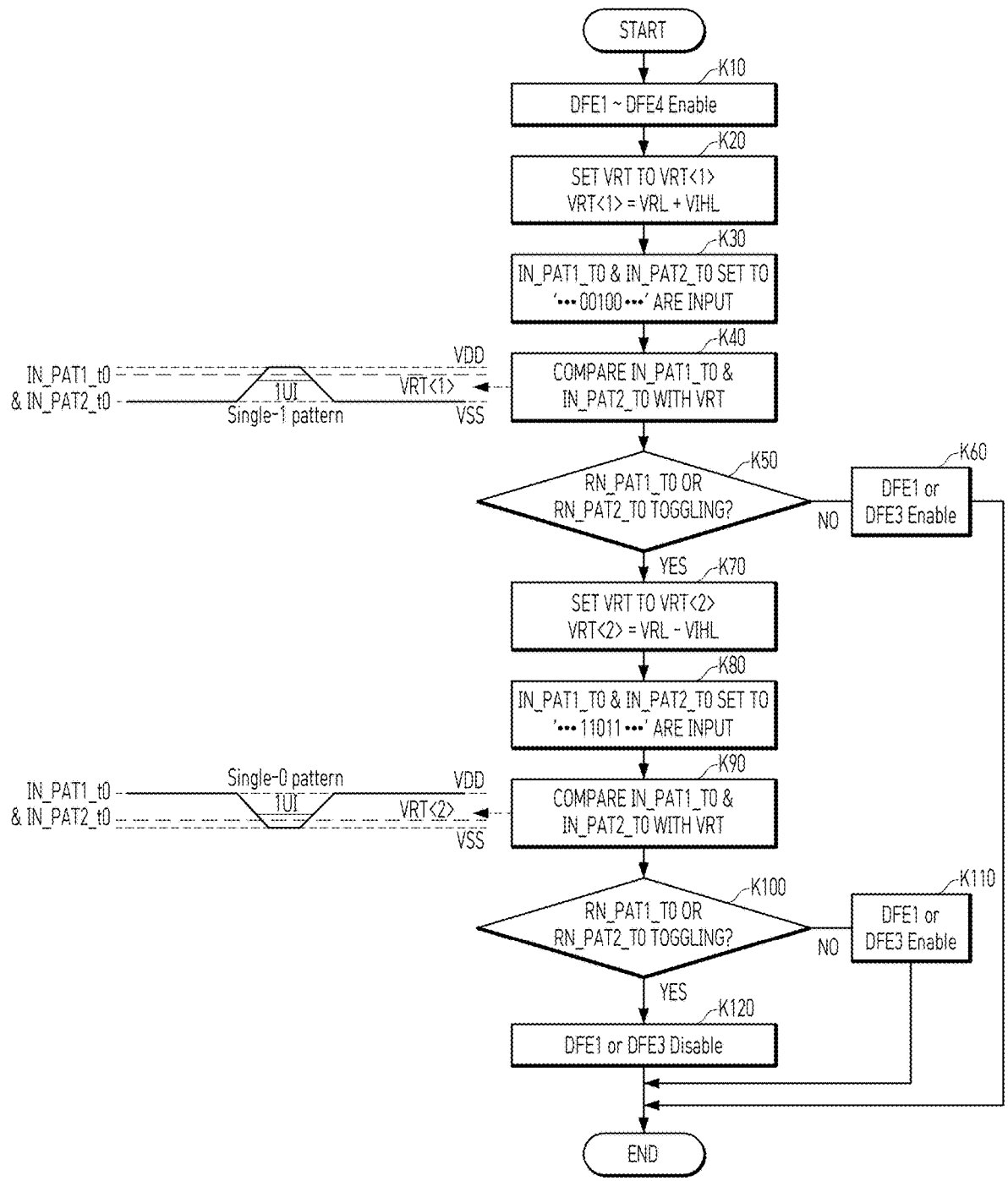
FIG. 9 is a diagram illustrating the sequence of the training operation performed by the receiver circuit in accordance with an embodiment of the present disclosure.

FIG. 9 is a diagram illustrating the sequence of the training operation performed by the receiver circuit 1 in accordance with an embodiment of the present disclosure.

Referring to FIG. 9, at the time of entering the training mode, the DFE1 103 and the DFE2 104 included in the first receiver operation unit 100 and the DFE3 203 and the DFE4 204 included in the second receiver operation unit 200 may all be set to an enabled state (K10).

Subsequently, the training reference level VRT may be set to the first training reference level VRT<1> higher than the normal reference level VRN by the predetermined level VIHL (K20).

After K20, the first period of the training mode may be entered and the first input pattern signal IN_PAT1_t0 and the second input pattern signal IN_PAT2_t0 may be input (K30). Each of the first input pattern signal IN_PAT1_t0 and the second input pattern signal IN_PAT2_t0 may have the first pattern, which may be a pattern with at least one '1' value among a plurality of '0' values.

After K30, the first training reference level VRT<1> may be compared with the potential levels of the first input pattern signal IN_PAT1_t0 and the second input pattern signal IN_PAT2_t0 (K40). Further, the logic levels of the first input pattern signal IN_PAT1_t0 and the second input pattern signal IN_PAT2_t0 may be determined. Furthermore, the first reception pattern signal RV_PAT1_t0 and the second reception pattern signal RV_PAT2_t0 may be generated according to logic levels corresponding to the determined result (K40).

It may be confirmed whether the first reception pattern signal RV_PAT1_t0 and the second reception pattern signal RV_PAT2_t0 generated in K40 each have the first pattern (K50). In such a case, since the first pattern is a pattern with at least one '1' value among a plurality of '0' values, it may be confirmed in K50 whether the logic level of each of the first reception pattern signal RN_PAT1_t0 and the second reception pattern signal RN_PAT2_t0 is toggled to logic high between logic lows.

In K50, when the first reception pattern signal RN_PAT1_t0 or the second reception pattern signal RN_PAT2_t0 is not toggled differently from the first pattern (NO in K50), the DFE1 103 or the DFE3 203 set to an enabled state in K10 may be enabled (K60).

When the first reception pattern signal RN_PAT1_t0 or the second reception pattern signal RN_PAT2_t0 in K50 is toggled according to the first pattern (YES in K50), the training reference level VRT may be set to the second training reference level VRT<2> lower than the normal reference level VRN by the predetermined level VIHL (K70).

After K70, the first period of the training mode may be entered, and the first input pattern signal IN_PAT1_t0 and the second input pattern signal IN_PAT2_t0 may be input (K80). Each of the first input pattern signal IN_PAT1_t0 and the second input pattern signal IN_PAT2_t0 may have the second pattern, which may be a pattern with at least one '0' value among a plurality of '1' values.

After K80, the second training reference level VRT<2> may be compared with the potential levels of the first input pattern signal IN_PAT1_t0 and the second input pattern signal IN_PAT2_t0 (K90). Further, the logic levels of the first input pattern signal IN_PAT1_t0 and the second input pattern signal IN_PAT2_t0 may be determined. Further, the first reception pattern signal RV_PAT1_t0 and the second reception pattern signal RV_PAT2_t0 may be generated according to logic levels corresponding to the determined result (K90).

It may be confirmed whether the first reception pattern signal RV_PAT1_t0 and the second reception pattern signal RV_PAT2_t0 generated in K90 each have the second pattern (K100). In such a case, since the second pattern is a pattern with at least one '0' value among a plurality of '1' values, it may be confirmed in K100 whether the logic level of each of the first reception pattern signal RN_PAT1_t0 and the second reception pattern signal RN_PAT2_t0 is toggled to logic low between logic highs.

In K100, when the first reception pattern signal RN_PAT1_t0 or the second reception pattern signal RN_PAT2_t0 is not toggled differently from the second pattern (NO in K100), the DFE1 103 or the DFE3 203 set to an enabled state in K10 may be enabled (K110).

When the first reception pattern signal RN_PAT1_t0 or the second reception pattern signal RN_PAT2_t0 in K100 is toggled according to the second pattern (YES in K100), the DFE1 103 or the DFE3 203 set to an enabled state in K10 may be disabled (K120).

Depending on the embodiment, in K50 described above, the first reception pattern signal RN_PAT1_t0 may not be toggled differently from the first pattern, and the second reception pattern signal RN_PAT2_t0 may be toggled according to the first pattern. In such a case, the DFE1 103 may continuously maintain an enabled state through K60, and the operations corresponding to K70, K80, K90, K100, K110, and K120 may be performed only for the second reception pattern signal RN_PAT2_t0.

Depending on the embodiment, in K100 described above, the second reception pattern signal RN_PAT2_t0 may not be toggled differently from the second pattern and the first reception pattern signal RN_PAT1_t0 may be toggled according to the second pattern. In such a case, the DFE3 203 may continuously maintain an enabled state through K110, and the DFE1 103 may be disabled through K120.

The embodiments of the present disclosure described above are not limited by the aforementioned embodiments and the accompanying drawings, and it will be apparent to those skilled in the art to which the present disclosure pertains that various replacements, modifications, and changes can be made without departing from the technical spirit of the present disclosure.

For example, the position and the type of a logic gate and a transistor illustrated in the aforementioned embodiments should be differentially realized according to the polarity of an inputted signal. Furthermore, the embodiments may be combined to make additional embodiments.

What is claimed is:

1. A receiver circuit comprising:
a first input unit configured to receive a first input pattern signal as a first reception pattern signal according to a training reference level, and to receive a first input normal signal as a first reception normal signal according to a normal reference level, wherein the first input pattern signal is applied through a first pad in a training mode, and the first input normal signal is applied through the first pad in a normal mode after the training mode;
a first enable control unit configured to determine whether to activate a first enable signal according to a result of confirming a value of the first reception pattern signal in the training mode;
a first decision feedback equalizer configured to operate in an activation period of the first enable signal, and to remove a first post-cursor component for the first reception normal signal by calibrating a currently received value based on a first previously received value of the first reception normal signal; and
a second decision feedback equalizer configured to, when the first enable signal is in an activated state, remove second to $N^{th}$ post-cursor components for the first reception normal signal by adjusting driving abilities of first input transistors, to which the currently received value is applied, according to patterns of second to $N^{th}$ previous received values of the first reception normal signal, where N is a natural number of 2 or more.

2. The receiver circuit of claim 1, wherein, when the first enable signal is in a deactivated state, the second decision feedback equalizer removes first to $N^{th}$ post-cursor components for the first reception normal signal by adjusting the driving abilities of the first input transistors, to which the currently received value is applied, according to patterns of first to $N^{th}$ previous received values of the first reception normal signal.

3. The receiver circuit of claim 2, wherein the first enable control unit activates the first enable signal in response to entering the training mode, and deactivates the first enable signal in response to confirming that the value of the first reception pattern signal is a predetermined pattern value during a period in which the training mode is entered.

4. The receiver circuit of claim 2, further comprising:
a second input unit configured to receive a second input pattern signal as a second reception pattern signal according to the training reference level, and to receive a second input normal signal as a second reception normal signal according to the normal reference level, wherein the second input pattern signal is applied through a second pad in the training mode, and the second input normal signal is applied through the second pad in the normal mode;
a second enable control unit configured to determine whether to activate a second enable signal according to a result of confirming a value of the second reception pattern signal in the training mode;
a third decision feedback equalizer configured to operate in an activation period of the second enable signal, and to remove a first post-cursor component for the second reception normal signal by calibrating a currently received value based on a first previously received value of the second reception normal signal; and
a fourth decision feedback equalizer configured to, when the second enable signal is in an activated state, remove second to $N^{th}$ post-cursor components for the second reception normal signal by adjusting driving abilities of second input transistors, to which the currently received value is applied, according to patterns of second to $N^{th}$ previous received values of the second reception normal signal.

5. The receiver circuit of claim 4, wherein, when the second enable signal is in a deactivated state, the fourth decision feedback equalizer removes first to $N^{th}$ post-cursor components for the second reception normal signal by adjusting the driving abilities of the second input transistors, to which the currently received value is applied, according to patterns of first to $N^{th}$ previous received values of the second reception normal signal.

6. The receiver circuit of claim 5, wherein the second enable control unit activates the second enable signal in response to entering the training mode, and deactivates the second enable signal in response to confirming that the value of the second reception pattern signal is the predetermined pattern value during the period in which the training mode is entered.

7. The receiver circuit of claim 5, wherein the first and second input pattern signals are set to a first pattern in a first period of the training mode and applied in parallel through the first and second pads, and are set to a second pattern different from the first pattern in a subsequent second period of the training mode and applied in parallel through the first and second pads, wherein in the first period of the training mode, the first and second input units receive the first and second input pattern signals as the first and second reception pattern signals, respectively, according to a first training reference level, and wherein in the second period of the training mode, the first and second input units receive the first and second input pattern signals as the first and second reception pattern signals, respectively, according to a second training reference level different from the first training reference level.

8. The receiver circuit of claim 7, wherein:
the first pattern includes at least one '1' value between a plurality of '0' values,
the second pattern includes at least one '0' value between a plurality of '1' values,
the first training reference level has a level greater than the normal reference level by a predetermined level, and
the second training reference level has a level less than the normal reference level by the predetermined level.

9. The receiver circuit of claim 8, wherein the first enable control unit activates the first enable signal in response to entering the training mode, and deactivates the first enable signal when a first confirmation number is a predetermined number, and
wherein the first confirmation number is obtained by adding a counted value of the number of '1' values included in the first reception pattern signal in the first period of the training mode, and a counted value of the number of '0' values included in the first reception pattern signal in the second period of the training mode.

10. The receiver circuit of claim 9, wherein the second enable control unit activates the second enable signal in response to entering the training mode, and deactivates the second enable signal when a second confirmation number is the predetermined number, and
wherein the second confirmation number is obtained by adding a counted value of the number of '1' values included in the second reception pattern signal in the first period of the training mode, and a counted value of the number of '0' values included in the second reception pattern signal in the second period of the training mode.

11. An operation method of a receiver circuit, the operation method comprising:
a first reception operation of receiving a first input pattern signal as a first reception pattern signal according to a training reference level, and receiving a first input normal signal as a first reception normal signal according to a normal reference level, wherein the first input pattern signal is applied through a first pad in a training mode, and the first input normal signal is applied through the first pad in a normal mode after the training mode;
a first enable control operation of determining whether to activate a first enable signal according to a result of confirming a value of the first reception pattern signal; and
an operation of, when the first enable signal is in an activated state in the normal mode, removing a first post-cursor component for the first reception normal signal by calibrating a currently received value based on a first previously received value of the first reception normal signal, and removing second to $N^{th}$ post-cursor components for the first reception normal signal by adjusting driving abilities of first input transistors, to which the currently received value is applied, according to patterns of second to $N^{th}$ previous received values, where N is a natural number of 2 or more.

12. The operation method of claim 11, further comprising:
an operation of, when the first enable signal is in a deactivated state in the normal mode, removing first to $N^{th}$ post-cursor components for the first reception normal signal by adjusting the driving abilities of the first input transistors, to which the currently received value is applied, according to patterns of first to $N^{th}$ previous received values of the first reception normal signal.

13. The operation method of claim 12, wherein the first enable control operation comprises:
an operation of activating the first enable signal in response to entering the training mode,
an operation of deactivating the first enable signal in response to confirming that the value of the first reception pattern signal is a predetermined pattern value during a period in which the training mode is entered; and
an operation of maintaining an activated state of the first enable signal in response to confirming that the value of the first reception pattern signal is not the predetermined pattern value during the period in which the training mode is entered.

14. The operation method of claim 12, further comprising:
a second reception operation of receiving a second input pattern signal as a second reception pattern signal according to the training reference level, and to receive a second input normal signal as a second reception normal signal according to the normal reference level, wherein the second input pattern signal is applied through a second pad in the training mode, and the second input normal signal is applied through the second pad in the normal mode;
a second enable control operation of determining whether to activate a second enable signal according to a result of confirming a value of the second reception pattern signal; and
an operation of, when the second enable signal is in an activated state in the normal mode, removing a first post-cursor component for the second reception normal signal by calibrating a currently received value based on a first previously received value of the second reception normal signal, and removing second to $N^{th}$ post-cursor components for the second reception normal signal by adjusting driving abilities of second input transistors, to which the currently received value is applied, according to patterns of second to $N^{th}$ previous received values.

15. The operation method of claim 14, further comprising:
an operation of, when the second enable signal is in a deactivated state in the normal mode, removing first to $N^{th}$ post-cursor components for the second reception normal signal by adjusting the driving abilities of the second input transistors, to which the currently received value is applied, according to patterns of first to $N^{th}$ previous received values of the second reception normal signal.

16. The operation method of claim 15, wherein the second enable control operation comprises:
an operation of activating the second enable signal in response to entering the training mode,
an operation of deactivating the second enable signal in response to confirming that the value of the second reception pattern signal is the predetermined pattern value during the period in which the training mode is entered, and an operation of maintaining an activated state of the second enable signal in response to confirming that the value of the second reception pattern signal is not the predetermined pattern value during the period in which the training mode is entered.

17. The operation method of claim 15, wherein the first and second input pattern signals are set to a first pattern in a first period of the training mode and applied in parallel through the first and second pads, and are set to a second pattern different from the first pattern in a subsequent second period of the training mode and applied in parallel through the first and second pads, wherein the first reception operation comprises:

an operation of receiving the first input pattern signal as the first reception pattern signal according to a first training reference level in the first period of the training mode, and an operation of receiving the first input pattern signal as the first reception pattern signal according to a second training reference level different from the first training reference level in the second period of the training mode, and wherein the second reception operation comprises:

an operation of receiving the second input pattern signal as the second reception pattern signal according to the first training reference level in the first period of the training mode, and an operation of receiving the second input pattern signal as the second reception pattern signal according to the second training reference level in the second period of the training mode.

18. The operation method of claim 17, wherein the first pattern includes at least one '1' value between a plurality of '0' values, the second pattern includes at least one '0' value between a plurality of '1' values, the first training reference level has a level greater than the normal reference level by a predetermined level, and the second training reference level has a level less than the normal reference level by the predetermined level.

19. The operation method of claim 18, wherein the first enable control operation comprises:

an operation of activating the first enable signal in response to entering the training mode;

a first counting operation of counting the number of '1' values included in the first reception pattern signal in the first section of the training mode;

a second counting operation of counting the number of '0' values included in the first reception pattern signal in the second section of the training mode;

an operation of deactivating the first enable signal when a first confirmation number obtained by adding values counted in each of the first and second counting operations is a predetermined number; and an operation of substantially maintaining an activated state of the first enable signal when the first confirmation number is different from the predetermined number.

20. The operation method of claim 19, wherein the second enable control operation comprises:

an operation of activating the second enable signal in response to entering the training mode;

a third counting operation of counting the number of '1' values included in the second reception pattern signal in the first section of the training mode;

a fourth counting operation of counting the number of '0' values included in the second reception pattern signal in the second section of the training mode;

an operation of deactivating the second enable signal when a second confirmation number obtained by adding values counted in each of the third and fourth counting operations is the predetermined number; and an operation of maintaining an activated state of the second enable signal when the second confirmation number is different from the predetermined number.

* * * * *